United States Patent [19]

Stojic

[11] Patent Number: 5,640,893

[45] Date of Patent: Jun. 24, 1997

[54] SPRING BRAKE ACTUATOR WITH GUIDE AND BEARING FOR AN ACTUATOR ROD

[75] Inventor: Steven M. Stojic, Holland, Mich.

[73] Assignee: NAI Anchorlok, Inc., Muskegon, Mich.

[21] Appl. No.: 505,281

[22] PCT Filed: Nov. 8, 1994

[86] PCT No.: PCT/US94/12862

§ 371 Date: Aug. 17, 1995

§ 102(e) Date: Aug. 17, 1995

[87] PCT Pub. No.: WO96/14231

PCT Pub. Date: May 17, 1996

[51] Int. Cl.⁶ .................................. F01B 7/00
[52] U.S. Cl. .................................. 92/63; 92/130 A
[58] Field of Search ................. 92/17, 63, 130 A

[56] References Cited

U.S. PATENT DOCUMENTS

| | | |
|---|---|---|
| 3,217,611 | 11/1965 | Leighton . |
| 3,411,417 | 11/1968 | Swander ........................ 92/63 |
| 3,625,117 | 12/1971 | Tazelaar ........................ 92/63 |
| 3,943,829 | 3/1976 | Newstead et al. ............... 92/63 |
| 5,320,026 | 6/1994 | Pierce . |

FOREIGN PATENT DOCUMENTS

| | | |
|---|---|---|
| 23 29 536 | 1/1975 | Germany . |
| 25 50 206 | 2/1977 | Germany . |
| 2905211 | 8/1979 | Germany ........................ 92/63 |

*Primary Examiner*—Thomas E. Denion
*Attorney, Agent, or Firm*—Varnum, Riddering, Schmidt & Howlett LLP

[57] ABSTRACT

A bearing (104) is mounted to the caging bolt head (86) within a hollow actuator rod (60) of a spring brake actuator (14). The bearing (104) is self-lubricated to guide movement of the actuator rod during application and release of the spring brake and to minimize friction.

9 Claims, 2 Drawing Sheets

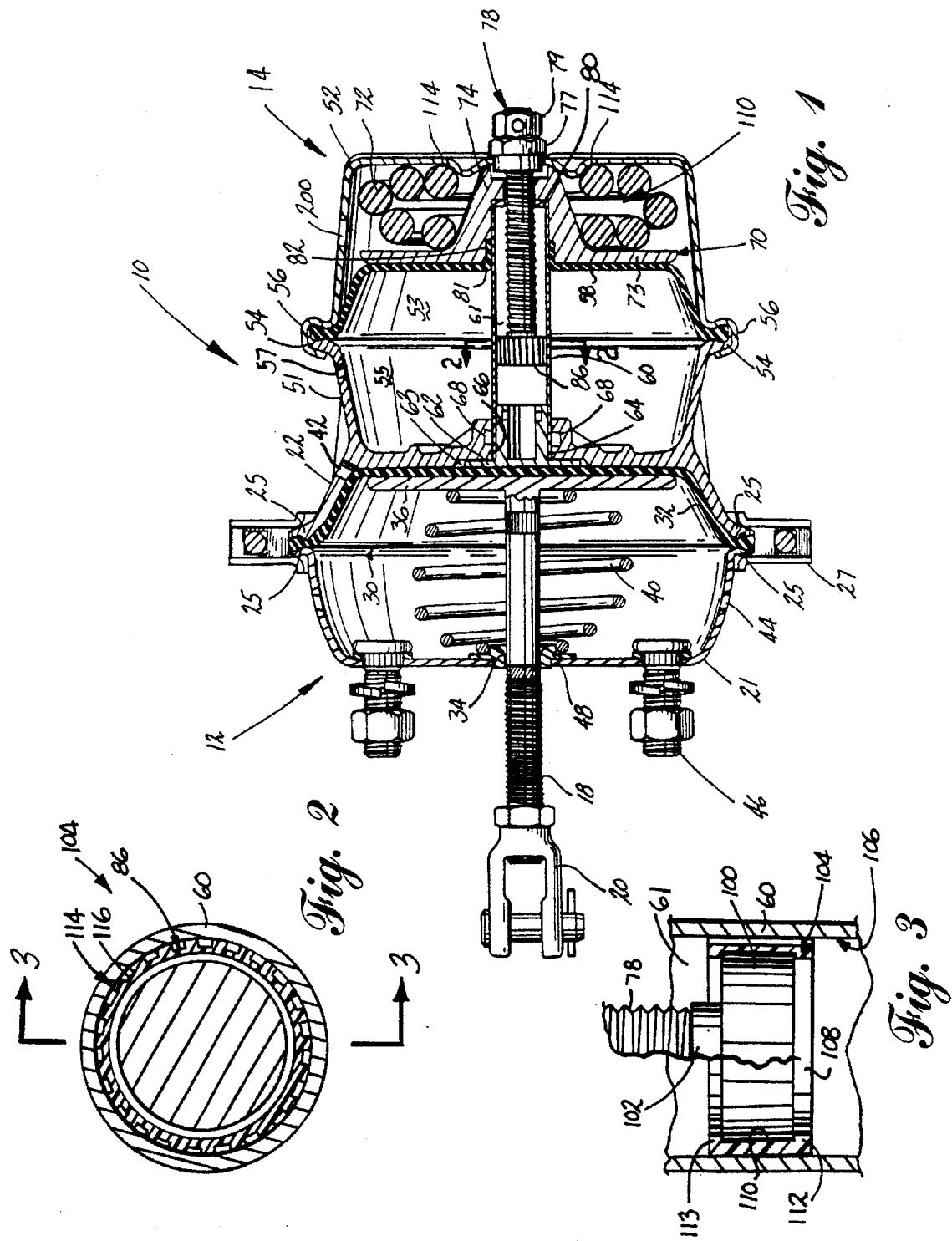

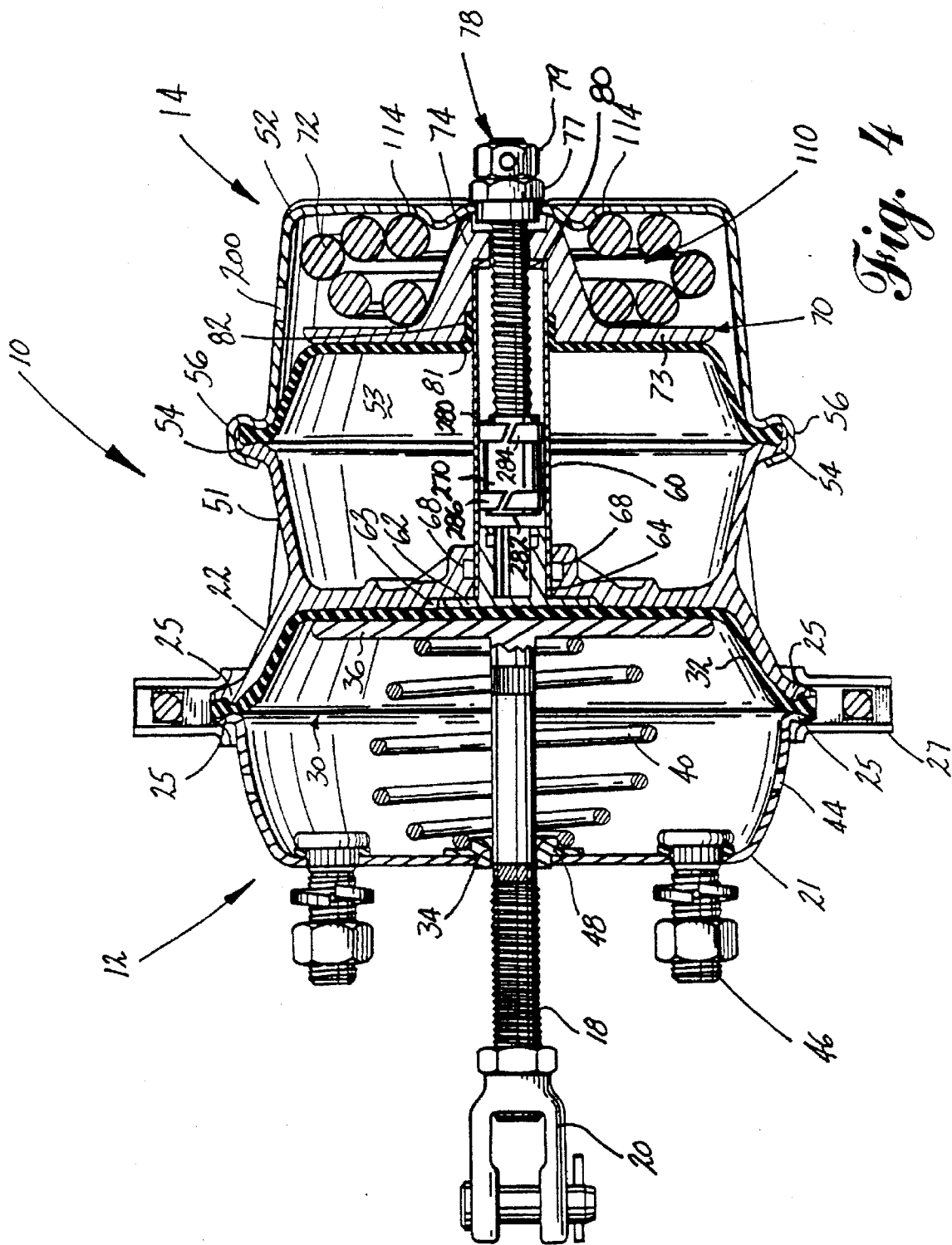

SPRING BRAKE ACTUATOR WITH GUIDE AND BEARING FOR AN ACTUATOR ROD

BACKGROUND OF THE INVENTION

1. Field of the Invention

This invention relates to a spring brake actuator. More specifically, the invention relates to a spring brake actuator with a guide and bearing for an actuator rod.

2. State of the Prior Art

A brake system for a vehicle such as a bus, truck or the like typically includes a brake shoe and drum assembly which is controlled by a brake actuator. Conventional air brake actuators have both a service brake actuator and an emergency brake actuator. The service brake actuator applies the brakes under normal driving conditions by the application of compressed air. The emergency brake actuator includes a strong compression spring which applies the brake when air is released. This actuator is often referred to as the spring brake actuator. Typically, the spring brake actuator is disposed in tandem with a service brake actuator.

A chamber in the spring brake is normally pressurized with air. One wall of the chamber is moveable and typically comprises either a diaphragm or a piston. It, in turn, acts against the compression spring so that pressure in the chamber compresses the spring.

In the event of a loss of air pressure or an intentional exhaustion of air from the spring brake actuator chamber, the brake will be mechanically activated by the force of the strong compression spring acting on a spring brake actuator rod which, in turn, acts upon the service brake actuator or directly to apply the brakes. Thus, the spring brake actuator serves both as a parking brake and an emergency brake. In some applications the spring brake actuator is designed to operate solely as a parking brake, as for instance, when the service brake actuator is hydraulically operated.

U.S. Pat. No. 5,105,727 to Bowyer, issued Apr. 21, 1992, discloses a known spring brake assembly which includes both a spring brake actuator and a service brake actuator. The service brake actuator includes an air chamber partially defined by a flexible diaphragm acting against a service brake push rod and a return spring to assure proper release of the brake when air is exhausted from the air chamber. The spring brake actuator also includes an air chamber comprising a spring brake housing and a spring brake actuator rod disposed integrally with a spring brake pressure plate and secured to the spring brake diaphragm. The spring brake diaphragm is provided with a centrally disposed aperture and engages the actuator rod and pressure plate to form an airtight seal. A strong power spring acts between an end of the spring brake housing and the pressure plate, and tends to urge the actuator rod out of the air chamber to engage the diaphragm and push rod of the service brake and to cause the brake to be applied. During normal operation, the spring force is counteracted by air pressure in the spring brake air chamber which acts against the diaphragm to compress the power spring, retracting the actuator rod. When system air pressure is lost, or manually released, the power spring extends to apply the brakes.

The actuator rod is hollow and provided with a central bore. The proximal end (nearest the spring brake housing) of the actuator rod is partially closed by an inwardly directed annular flange on a pressure plate. A brake releasing caging bolt extends into the central bore from outside of the spring brake housing and has a head for engaging the annular flange. The bolt is threaded and extends out of the actuator rod, through an aperture in the spring brake housing, through a threaded nut, and terminates in a wrench nut.

The compression spring does not always extend evenly in an axial direction so that the pressure plate and the actuator rod attached to it can wobble or become cocked. Consequently, the caging bolt head may abrade the interior wall of the actuator rod as it moves when the emergency brake is applied or released.

SUMMARY OF THE INVENTION

In accordance with the invention, the foregoing problem is overcome by providing a bearing on the caging bolt head, between the head and the interior wall of the actuator rod. The bearing serves to guide reciprocal movement of the actuator rod over the head and also minimizes friction between the two surfaces.

Preferably, the bearing is formed of nylon and attaches to the head by snap-fit engagement. Also, the bearing surface has longitudinal grooves to permit the flow of air from one side of the head to the other within the actuator rod.

In another aspect of the invention, the head is elongated, and the bearing comprises two discrete rings, one near each end of the head.

BRIEF DESCRIPTION OF THE DRAWINGS

FIG. 1 is an elevational view in cross-section of a spring brake actuator according to the invention;

FIG. 2 is a cross-sectional view of the spring brake actuator of FIG. 1 taken along lines 2—2 of FIG. 1;

FIG. 3 is cross-sectional view taken along lines 3—3 of FIG. 2; and

FIG. 4 is an elevational view in cross-section of a second embodiment of the invention.

DETAILED DESCRIPTION OF THE DRAWINGS

Referring to the drawings and to FIG. 1 in particular, a cross-sectional view of an air-operated brake actuating unit 10 having a general configuration well known in the art is illustrated. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted to connect to a conventional brake system (not shown) in a standard fashion. Reciprocating motion of the push rod 18 will cause the brake to be alternately applied and released.

The service brake 12 comprises a pair of facing cup-shaped housing sections 21 and 22, each having an outwardly directed ranged edge 25. The housing sections 21 and 22 are clamped together at their ranged edges by means of a clamp 27 to form a service brake inner chamber 30. Flanged edges 25 of the housing sections 21 and 22 compress and clamp a peripheral edge of an elastomeric diaphragm 32 suspended within the inner chamber 30.

The service brake push rod 18 extends through a central opening 34 in housing section 21 and into the service brake chamber 30 where it terminates in a pressure plate 36. A compression spring 40 extends between pressure plate 36 and the interior surface of the housing section 21. A spring seat 48 disposed around the central opening 34 receives the end of the compression spring 40 and retains it in position around the opening 34. The spring 40 thus urges the pressure plate 36 and the service brake push rod 18 to a fully retracted position.

To operate the service brake, compressed air is introduced through an air service port 42 in housing section 22 to force the diaphragm 32 and pressure plate 36 against the force of spring 40 to actuate the push rod 18. Openings 44 are provided in the housing section 21 to allow for the rapid evacuation of air from the inner chamber 30. Mounting studs 46 are provided to mount the brake actuating unit 10 onto a brake bracket.

The spring brake 14 comprises a pair of facing cup-shaped housing sections 51 and 52 joined at their edges to form an inner chamber 53. Housing section 51 is provided with an outwardly directed circumferential flanged edge 54. The housing sections 51 and 52 are clamped together by means of a peripheral curved edge 56 on housing section 52 engaging the edge 54 on housing section 51. An elastomeric diaphragm 58 is suspended within the spring brake chamber 53 and is compressed at its peripheral edge between the edges 54, 56 of housing sections 51 and 52. The portion of the chamber 53 between the diaphragm 58 and housing section 51 forms a pressure chamber 55 which is filled with compressed air supplied through an air service port 57 in housing section 51 when the emergency brake is in its normal released position.

An actuator rod 60, aligned with push rod 18 extends through a central opening 64 in an end wall of the housing section 51 and has a first end 90 adjacent the housing section 52. A second end 92 of the actuator rod 60 terminates in a reaction plate 62 disposed in an aligned central opening 63 in an end wall of housing section 22. The opening 64 is provided with a bearing 66 having seals 68 to form an airtight seal for the actuator rod 60. The actuator rod 60 extends through a centrally disposed aperture 81 in the diaphragm 58 and carries a pressure plate 70. A powerful compression spring 72 extends between the housing section 52 and the pressure plate 70. A substantially flat portion 73 of the pressure plate 70 engages one end of the spring 72 and a tubular portion 74 extends generally axially along the axis of spring 72. The tubular portion 74 is press-fit onto an end portion of actuator rod 60 such that the pressure plate 70 and the rod 60 form an integral unit. The pressure plate 70 may be formed of cast aluminum.

During normal operation of the brake 10, compressed air in the pressure chamber 55 holds the actuator rod 60 in the fully withdrawn position as shown in FIG. 1. However, in the event that system pressure is lost, either accidentally or due to manual release, the compressed air will escape from the pressure chamber 55 allowing the spring 72 to extend the actuator rod 60. When the compressed air is exhausted, the compression spring 72 forces the pressure plate 70 and rod 60, integrally attached to the pressure plate, in the direction of the brake push rod 18 of the service brake 12. When the brake is to be released, compressed air is once again introduced in the space between housing section 51 and diaphragm 58. The force of the compressed air against the diaphragm 58 causes the pressure plate 70, the rod 60 and the spring 72 to be returned to the position depicted in FIG. 1.

The actuator rod 60 is a hollow tube or rod provided with a central bore 61 to accommodate a brake release or caging bolt 78. The bolt 78 is adapted to engage an end edge 80 of the tubular portion 74 of the pressure plate 70 to maintain the spring 72 in a compressed position whenever such is desired. Thus, the bolt 78 may be used to manually release the spring brake or to ensure that the compression spring 72 will remain compressed when maintenance functions are performed on the brake assembly. The bolt 78 threads into a fixed threaded opening or nut such as a nut 77 affixed by welding or staking to the end wall of housing section 52. A second nut or wrench head 79 is fixedly attached to a proximal end of the threaded bolt such that the bolt may be rotated in nut 77 by a common wrench or the like.

The end edge 80 provides positive engagement with the walls of actuator rod 60 when the rod is actuated and further serves as an engagement surface for a caging bolt head 86 at the distal end of the caging bolt 78. The caging bolt head 86 engages the edge 80 when the bolt 78 is withdrawn to retain the compression spring 72 in its compressed state. Otherwise, the bolt 78 extends into the central bore 61 of actuator rod 60 by a sufficient distance to allow the actuator rod 60 to extend to its full length of travel without engagement between the edge 80 and caging bolt head 86.

Turning now to FIGS. 2 and 3, the caging bolt head 86 comprises a radially outwardly extending flange 100 at an inner end 102 of the caging bolt 78. A guide 104 encircles the flange 100 and has an outer bearing surface 114 formed of a self-lubricating material. Preferably, the guide 104 is molded from a polymer such as nylon, and when disposed between the caging bolt head 86 and an interior wall 106 of the actuator rod 60, it serves to guide reciprocal movement of the rod over the head and also minimizes friction between the two elements. The guide 104 is generally cylindrical and has an inner surface 108 with a shallow annular groove 110 between opposed annular flanges 112, 113. The flange 100 of the head 86 is nested within the annular groove 110 with the guide 104 being secured onto the flange 100 by a snap-fit engagement.

An outer surface 114 of the guide 104 is provided with a plurality of axially extending grooves 116. The axial grooves 116 allow any air which may be trapped within the actuator rod 60 to move freely past the caging bolt head 86 as the actuator rod 60 reciprocates.

FIG. 4 illustrates a second embodiment of the invention. As in the earlier embodiment, like numerals will be used to illustrate like elements of the second embodiment.

The caging bolt 78 extends coaxially into the actuator rod 60 to terminate in an elongated caging bolt head 270. The caging bolt head 270 is generally cylindrical having a proximal end 280 adjacent the caging bolt threads and an opposite distal end 282. A first Teflon™ guide 284 encircles the proximal end 280 and a second Teflon™ guide 286 encircles the distal end 282. The Teflon™ guides 284 and 286 bear against the inner wall 106 of the actuator rod 60. The first and second Teflon™ guides 284 and 286 are spaced apart a distance greater than the diameter of the caging bolt head 270 to stabilize any off-centered movement of the actuator rod 60. Preferably, the guides 284, 286 are fixed to the head 270 by an adhesive, or by staking or by being recessed in corresponding annular grooves (not shown)

While particular embodiments of the invention have been shown, it will be understood that the invention is not limited thereto since modification can be made by those skilled in the art, particularly in light of the foregoing teachings. For example, the spring brake actuator can be any one of a variety of configurations, such as a stand alone actuator (not in tandem with a service brake), piston-operated rather than diaphragm operated, hydraulic rather than pneumatic, or in an application known as air-over-hydraulic where a pneumatic spring brake actuator is adapted to operate in conjunction with a hydraulic service brake actuator. Reasonable variation and modification are possible within the foregoing disclosure of the invention without departing from its true spirit and scope.

We claim:

1. In a spring brake actuator comprising:

a housing having first and second end walls defining a housing interior, the first end wall having an aperture therethrough, a movable wall dividing the interior of the housing into a first chamber and a second chamber, a hollow actuator rod operably connected to the movable wall for reciprocating movement relative to the housing and having an interior surface and a first end extending into the aperture in the first end wall, a spring disposed within the second chamber between the second end wall and the movable wall, a caging bolt mounted to the second end wall and having a distal end extending into the hollow actuator rod; and a head on the distal end of the caging bolt, the improvement comprising:

a self-lubricated bearing mounted to the caging bolt head and disposed between the caging bolt head and the interior surface of the actuator rod to guide reciprocal movement of the actuator rod over the head and to minimize friction during such movement.

2. A spring brake actuator according to claim 1 wherein the bearing is formed of nylon.

3. A spring brake actuator according to claim 1 wherein the head comprises an annular flange and the bearing encircles the flange.

4. A spring brake actuator according to claim 3 wherein the bearing includes passages which permit air to pass from one side of the bearing to the other.

5. A spring brake actuator according to claim 1 wherein the bearing is generally cylindrical and attaches to the caging bolt head by snap-fit engagement.

6. A spring brake actuator according to claim 4 wherein the passages comprise longitudinal grooves on an exterior wall of the bearing.

7. A spring brake actuator according to claim 1 wherein the caging bolt head is generally cylindrical and elongated and the bearing comprises at least two discrete elements.

8. A spring brake actuator according to claim 7 wherein each element is a ring mounted to the caging bolt head and spaced from each other.

9. A spring brake actuator according to claim 8 wherein the rings are spaced at opposite ends of the caging bolt head.

* * * * *